US005900901A

United States Patent [19]
Costanza et al.

[11] Patent Number: 5,900,901
[45] Date of Patent: May 4, 1999

[54] METHOD AND APPARATUS FOR COMPENSATING FOR RASTER POSITION ERRORS IN OUTPUT SCANNERS

[75] Inventors: Daniel W. Costanza, Webster; Ronald E. Jodoin, Pittsford; Robert P. Loce, Webster, all of N.Y.

[73] Assignee: Xerox Corporation, Stamford, Conn.

[21] Appl. No.: 08/461,912

[22] Filed: Jun. 5, 1995

[51] Int. Cl.$^6$ .................................. B41J 2/47; B41J 2/435
[52] U.S. Cl. ............................................. 347/248; 347/253
[58] Field of Search ................................... 347/248, 252, 347/253, 247, 237

[56] References Cited

U.S. PATENT DOCUMENTS

| | | | |
|---|---|---|---|
| 4,073,566 | 2/1978 | Noguchi | 350/3.71 |
| 4,332,461 | 6/1982 | Cail et al. | 355/14 R |
| 4,707,122 | 11/1987 | Lama et al. | 355/71 |
| 4,707,710 | 11/1987 | Shinada | 346/108 |
| 4,761,662 | 8/1988 | Yoshimoto et al. | 346/108 |
| 4,794,413 | 12/1988 | Yamazaki et al. | 346/160 |
| 4,801,978 | 1/1989 | Lama et al. | 355/69 |
| 4,829,175 | 5/1989 | Goto et al. | 250/236 |
| 4,835,545 | 5/1989 | Mager et al. | 346/1.1 |
| 4,884,083 | 11/1989 | Loce et al. | 346/108 |
| 4,942,407 | 7/1990 | Tadokoro | 346/108 |
| 4,989,019 | 1/1991 | Loce et al. | 346/108 |
| 5,055,860 | 10/1991 | Bannai | 346/108 |
| 5,153,644 | 10/1992 | Yang et al. | 355/236 |
| 5,194,878 | 3/1993 | Murakami et al. | 346/108 |
| 5,337,076 | 8/1994 | Agano | 346/108 |
| 5,541,637 | 7/1996 | Ohashi et al. | 347/248 |
| 5,619,242 | 4/1997 | Haneda et al. | 347/131 |

FOREIGN PATENT DOCUMENTS 0-618-472-A2  5/1994  European Pat. Off. .

OTHER PUBLICATIONS

Steven J. Bloomberg; "The Third International Congress on Advances in Non–Impact Printing Technologies"; *Advance Printing of Paper Summaries;* Aug. 24–28, 1986; pp. 257–260.

R. Loce and W. Lama; "Halftone Banding due to Vibrations in a Xerographic Image Bar Printer"; *Journal of Imaging Technology;* vol. 16, No. 1, Feb. 1990; pp. 6–11.

R. Loce and W. Lama; "Exposure Strobing in Photocopiers"; *Journal of Imaging Science;* vol. 32, No. 6, Nov./Dec. 1988.

R. Loce, W. Lama, and M. Maltz; "Modeling Vibration–Induced Halftone Banding in a Xerographic Laser Printer"; *Journal of Electronic Imaging;* Jan., 1995; vol. 4(1); pp. 48–61.

K. Takiguchi, T. Miyagi, A. Okamura, H. Ishikawa, and F. Shibata; "Effect of Photoreceptor Drum Rotational Speed Variation on Laser Beam Printer Halftone Reproduction"; pp. 168–173.

P. Burns, M. Rabbani, and L. Ray; "Analysis of Image Noise Due to Position Errors in Laser Writers"; *Applied Optics;* vol. 25, No. 13; Jul. 1, 1986, pp. 2158–2168.

O. Hadar, I. Dror, N. Kopeika; "Image Resolution Limits Resulting From Mechanical Vibrations Part IV."; *Optical Engineering;* vol. 33, No. 2; Feb., 1994; pp. 566–578.

(List continued on next page.)

*Primary Examiner*—Safet Metjahic
*Assistant Examiner*—Christopher E. Mahoney
*Attorney, Agent, or Firm*—Duane C. Basch; Christopher D. Wait

[57] ABSTRACT

The present invention is a method and apparatus for compensating for position error inherent in a raster output scanning printing system by adjusting the intensity of image exposure to effect a correction in the output image. The invention is particularly well suited to compensate for position errors arising from a plurality of sources by first summing the errors and then applying a single compensating adjustment to the intensity of individual scan rasters based upon the position error thereof.

7 Claims, 6 Drawing Sheets

OTHER PUBLICATIONS

S.C. Som; "Analysis of the Effect of Linear Smear on Photographic Images"; *Journal of the Optical Society of America;* vol. 61, No. 7, Jul. 1971; pp. 859–864.

F. Bestenreiner, U. Greis, J. Helmberger, and K. Stadler; "Visibility and Correction of Periodic Interference Structures in Line–by–Line Recorded Images"; *Journal of Applied Photographic Engineering;* vol. 2, No. 2, Spring, 1976; pp. 86–92.

Paul C. Schubert; "Periodic Image Artifacts from Continuous–Tone Laser Scanners"; *Applied Optics;* vol. 25, No. 21, Nov. 1, 1986; pp. 3880–3884.

Paul W. Melnychuck and Rodney Shaw; "Fourier Spectra of Digital Halftone Images Containing Dot–Position Errors"; *J. Opt. Soc. Ame. A;* vol. 5, No. 8, Aug., 1988; pp. 1328–1338.

J. Bloomberg and P. G. Engeldrum; "Estimation of Color Errors due to Random Pixel Placement Errors"; *Journal of Imaging Technology;* vol. 16, No. 2, Apr. 1990; pp. 75–79.

D. Wulich, N. S. Dopeika; "Image Resolution Limits Resulting From Mechanical Vibrations"; *Optical Engineering;* vol. 26, No. 6, Jun., 1987; pp. 529–533.

Daniel D. Haas; "Contrast Modulation in Halftone Images Produced by Variation in Scanline Spacing"; *Journal of Imaging Technology;* 15: 46–55 (1989).

R. R. Firth, D. Dressler, E. Muka, M. Nabor, and J.C. Owens; "A Continuous–Tone Laser Color Printer"; *Electronics Research Laboratories;* pp. 1–25.

Louis D. Mailloux; "Exposure Compensation for Polygon Wobble Errors"; *Xerox Disclosure Journal;* vol. 14, No. 3, May/Jun. 1989.

Gerald F. Marshall; "Laser Beam Scanning"; *Optical Engineering;* vol. 8.

METHOD AND APPARATUS FOR COMPENSATING FOR RASTER POSITION ERRORS IN OUTPUT SCANNERS

This invention relates generally to a method and apparatus for compensating for position errors in a raster-based image output terminal, and more particularly to altering the exposure level for individual rasters in order to reduce visually perceptible image artifacts created by position errors.

CROSS REFERENCE

The following related application is hereby incorporated by reference for its teachings:

"Method for Restoring Images Scanned in the Presence of Vibration," G. Wolberg et al., application Ser. No. 08/343,390, filed Nov. 22, 1994.

BACKGROUND AND SUMMARY OF THE INVENTION

The present invention is directed to a method and apparatus capable of monitoring raster positioning errors (e.g., those produced by photoreceptor motion error, polygon wobble or optics vibration in a raster output scanning printing system) and altering the output signal in order to compensate for such error. Raster position errors as small as 0.5% give rise to visually objectionable banding in halftone output prints. Such errors typically arise in raster scan image output terminals (IOTs) due to polygon wobble and photoreceptor velocity non-uniformity. Although techniques have been proposed to eliminate such error, it is typically expensive to control or limit the error to an acceptable level; a level below which the error will not be detected by the unaided eye.

Heretofore, a number of patents and publications have disclosed techniques for compensating for position errors in image output terminals, the relevant portions of which may be briefly summarized as follows:

U.S. Pat. No. 4,073,566 to Noguchi et al., issued Feb. 14, 1978, discloses the use of a stationary hologram in the optical path of a beam scanning device in order to compensate for displacement of the beam resulting from errors in parallelism of the facets of a polygon mirror.

U.S. Pat. No. 4,707,122 to Lama et al., issued Nov. 17, 1987, discloses the use of an optical filter in the optical path of a reprographic machine to eliminate the effects of mechanical vibration that result in strobing (exposure modulation). The filter is tuned so as to have an incidence profile that is a function of the vibration frequencies.

U.S. Pat. No. 4,801,978 to Lama et al., issued Jan. 31, 1989, teaches an electronic printer employing an image write bar for exposing a photoconductive member. An encoder is used to monitor the vibration of the rotating photoconductive member, the signals generated by the encoder being employed to modify the on/off timing and/or the intensity of the image bar output.

U.S. Pat. No. 4,884,083 to Loce et al., issued Nov. 28, 1989, discloses a printing system employing a raster output scanning device that is compensated for the effects of motion of the medium that it is used to expose. The system disclosed is directed toward compensating for periodic exposure modulation in images transmitted by the raster output scanning device to the surface of a photoreceptor.

U.S. Pat. No. 4,332,461 to Cail et al., issued Jun. 1, 1982, teaches a servomotor system capable of monitoring and compensating for motion error in a continuously variable reduction copier. The copier employs a light-lens scanning carriage driven in relationship to the rotation of an image carrier.

As described by R. Loce, W. Lama, and M. Maltz in "Modeling Vibration-Induced Halftone Banding in a Xerographic Laser Printer," *Journal of Electronic Imaging,* Vol. 4 No. 1, p. 48–61, the relevant portions being hereby incorporated by reference, in a raster scanning printer, a laser beam is scanned across a photoreceptor in a direction perpendicular to the photoreceptor motion. When there is vibratory motion of the photoreceptor or wobble in the polygon mirror, the raster lines on the photoreceptor will not be evenly spaced. The authors analyze the positioning error and show that fractional raster spacing error is equal to photoreceptor fractional velocity error. The raster position errors result in various print defects, of which halftone banding is the dominant defect.

Polygon wobble in laser scanners is described in "Laser Beam Scanning-Opto-Mechanical Devices, Systems and Data Storage Optics," Marcel Dekker, Inc. (1985), p. 78. A possible correction technique for such wobble is described by L. Mailloux in "Exposure Compensation for Polygon Wobble Errors," *Xerox Disclosure Journal,* Vol. 14, No. 3, May/June 1989, where it is suggested that exposure control may be employed to reduce the resulting error.

Also, several authors have considered the effects of non-uniform photoreceptor motion and other sources of noise in digital printers, including Bestenreiner, Geis, Helmberger, and Stadler, "Visibility and Correction of Periodic Interference Structures in Line-by-Line Recorded Images," *J. Appl. Phot. Engr.* Vol. 2, p. 86–92 (1976); Takiguchi, Miyagi, Okamura, Ishoshi, and Shibata, "Effect of Photoreceptor Drum Rotational Speed Variation on Laser Beam Printer Halftone Reproduction," *Proceedings of the SPSE Third International Congress: Recent Advances in Non-Impact Printing Technologies,* p. 168–172, San Francisco (Aug. 1986). Haas "Contrast Modulation in Halftone Images Produced by Variation in Scan Line Spacing," *J. Imaging Tech.* Vol. 15, p. 46 (1989), examined the effects of periodic scan line position errors when printing periodic binary patterns (e.g., halftones). Bloomberg and Engeldrum, "Color Error due to Pixel Placement Errors in a Dot Matrix Printer," *Proceedings of the SPSE Third International Congress: Recent Advances in Non-impact Printing Technologies,* p. 257–260 (Aug. 1986), analyze color error on a print that is caused by random pixel placement errors. Loce and Lama in "Halftone Banding due to Vibrations in a Xerographic Image Bar Printer," *Journal of Imaging Technology,* Vol. 16, No. 1, p. 6–11 (1990) and in "Halftone Banding Due to Vibrations in a Xerographic Image Bar Printer," SPSE 41st Annual Conference, Washington (1988), employ exposure and xerographic models to examine vibration induced halftone banding in image bar printers.

In "Color Errors Due to Pixel Placement Errors in a Dot Matrix Printer," *Third International Congress on Advances in Non-impact Printing Technologies—Society of Photographic Scientists and Engineers,* (Aug. 24, 1986), pp. 257–260, S. Bloomberg teaches the modeling of a dot matrix printer using a structured dot theory. The model was used to study the impact of pixel placement errors on color.

In accordance with the present invention, there is provided a raster output scanning printer, including: an exposure device suitable for emitting a light beam therefrom; a movable imaging member; a rotating, multifaceted polygon suitable for reflecting the light beam toward a photoresponsive surface of said imaging member; a controller for controlling the velocity of the photoresponsive surface about a nominal velocity; means for monitoring the velocity of the photoresponsive surface and determining the deviation thereof from the nominal velocity; means for determining the deviation of the position of the light beam from a nominal position on the photoresponsive surface; first compensation means, responsive to the velocity deviation of the photoresponsive surface, for producing a first motion compensation signal; second compensation means, responsive to the light beam position deviation, for producing a second motion compensation signal; a summing circuit for summing the first motion compensation signal and the second motion compensation signal to produce a cumulative error signal; and means for altering the exposure level produced by the light beam in response to the cumulative error signal to expose the imaging member in a manner so as to compensate for the motion error arising from the velocity and light beam deviations.

In accordance with another aspect of the present invention, there is provided a raster printer, including: a movable imaging member; an exposure device suitable for raster-wise exposing a surface of the imaging member and thereby creating a latent image thereon; a plurality of position deviation detection means, each generating a compensation signal representative of the deviation of an exposed raster from a nominal position on the surface of the imaging member; summation means, responsive to the compensation signals generated by said plurality of position deviation detection means, for producing a cumulative error signal; and means for altering the exposure level of said exposure device in response to the cumulative error signal to expose the surface of the imaging member in a manner so as to compensate for the cumulative error.

In accordance with yet another aspect of the present invention, there is provided a method for automatically compensating for raster position deviations in a raster printing system, including the steps of: predicting an intensity variation for a raster exposed on an imaging member where the intensity variation is caused by each of a plurality of sources of motion error within the raster printing system summing the intensity variations from each of the plurality of sources of motion error; and altering, in response to the summed intensity variation, the level at which each pixel of a subsequent raster is exposed on the imaging member to compensate for the motion error.

One aspect of the invention deals with a basic problem in the variance or deviation of raster placement on a photoconductive surface in order to print an output image. This aspect is further based on the discovery of an inexpensive technique that alleviates cumulative positional error arising from multiple sources (e.g., photoreceptor motion nonuniformity and polygon wobble). The technique alters the local exposure level of pixels within a raster based upon the error in positioning of the raster with respect to a nominal raster position. The local exposure level may be altered by either varying the intensity of a exposure device or by altering the exposure period with a constant intensity device (effectively varying intensity).

The technique described herein is advantageous because it is inexpensive compared to other approaches. In addition, it can be used to correct for positional errors no matter what the source, so long as the error can be characterized or monitored and the plural sources can be summed.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "processor" is any circuitry that can process data, and may include one or more central processing units or other processing components. A "processing unit" is a processor that is a component within another processor. "Processing circuitry" is circuitry within a processor or processing unit that processes data.

Any two components are "connected" when there is a combination of circuitry that can transfer signals from one of the components to the other. For example, two components are "connected" by any combination of connections between them that permits transfer of signals from one of the components to the other. Similarly, two or more components are "interconnected" when each component is connected to every other component through some combination of connections.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

An "image" is a pattern of physical light. An item of data "defines" an image when the item of data includes sufficient information to produce the image. For example, a two-dimensional array can define all or any part of an image, with each item of data in the array providing a value indicating the color of a respective location of the image.

A "pixel" is the smallest segment into which an image is divided in a given system. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image.

An "image input device" or "image input terminal" (IIT) is a device that can receive an image and provide an item of data defining a version of the image. A "scanner" is an image input device that receives an image by a scanning operation, such as by scanning a document. An "image output device" (IOT) is a device that can receive an item of data defining image and provide the image as output. A "display" is an image output device that provides the output image in human viewable form. The visible pattern presented by a display is a "displayed image" or simply "image." A raster output scanner is an image output device that generates a printed image in response to the exposure of a photoconductive member using a scanning beam.

Figure 1:
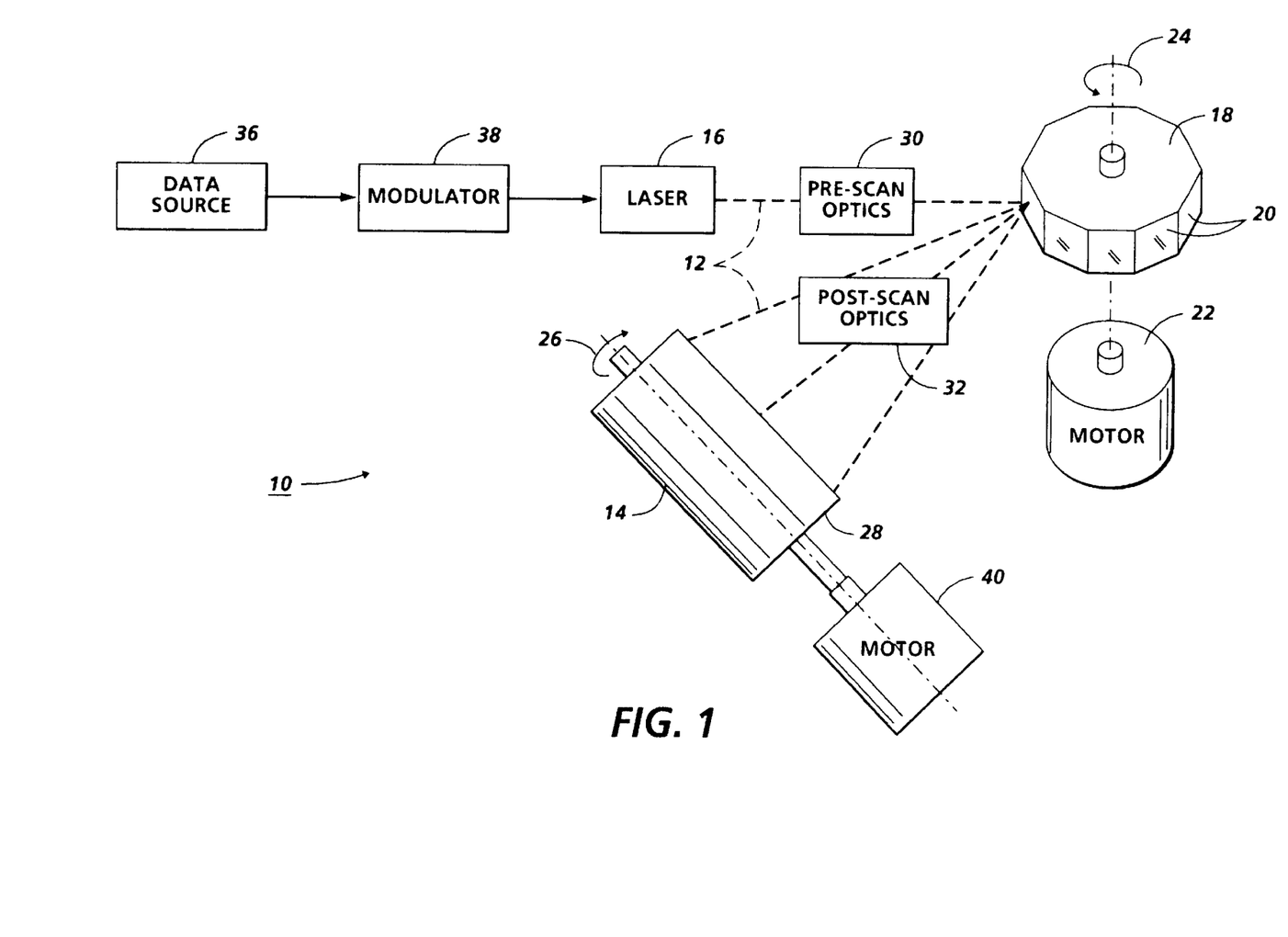
FIG. 1 is an illustration of the general features of a laser printer.

In FIG. 1 there is illustrated a conventionally configured optical system of a xerographic printer (not shown). Flying spot raster output scanning (ROS) system 10 scans a data modulated light beam 12 over a photoresponsive imaging member (photoreceptor) 14 in accordance with a predetermined raster scanning pattern. The ROS preferably comprises a laser diode 16 for emitting the light beam 12 in a visible or invisible (e.g., infrared) band, together with a rotating polygon scanner 18 that has a plurality of mirror-like exterior sidewalls or "facets" 20. Alternatively, the instant invention may find application in other imaging systems, including a full-width light emitting diode (LED) array and an ionographic imaging system, where the level of charge remaining on the imaging surface after exposure may be modulated on a raster by raster basis to effectuate the position error correction of the present invention.

In keeping with standard ROS design practices, there is a motor 22 for rotating the polygon 18 about a central axis, as indicated by arrow 24, at a substantially constant angular velocity. Scanner 18 is optically aligned between laser 16 and photoreceptor 14, so its rotation causes laser beam 12 to be intercepted and reflected from one facet 20 after another on the polygon, with the result that the beam 12 is cyclically swept or scanned across the photoreceptor 14 in a fast scan direction. Photoreceptor 14, on the other hand, is advanced, by motor 40 operatively coupled thereto, simultaneously in an orthogonal, process direction at a substantially constant linear velocity, as indicated by the arrow 26. Operation of the modulator 38, the motor 22 and motor 40 are preferably interrelated so that laser beam 12 scans the photoreceptor 14 in accordance with a raster scan pattern. As shown, the photoreceptor 14 is coated on a rotating drum 28, but it will be apparent that it also could be carried by a belt or any other suitable substrate to produce a photoresponsive member.

Typically, the ROS additionally includes pre-scan optics 30 and post-scan optics 32 for bringing the laser beam 12 to a generally circular focus proximate the photoreceptor 14 and for providing any optical correction required to compensate for optical irregularities. Preferably, the optical aperture of the ROS is sufficiently large to avoid excessive truncation of the laser beam 12 because the beam 12 then comes to a generally circular or elliptical focus with a gaussian intensity profile.

The amplitude, duty cycle, and/or pulse width of the laser beam 12 is serially modulated (collectively referred to herein as "intensity modulation") in accordance with successive multi-bit digital data (video) values. These data values are clocked out of a data source 36 serially in response to data clock pulses that are time synchronized with the scan of the beam scan spot from pixel to pixel within the raster scan pattern. Thus, the data clock frequency can be selected (by means not shown) to map the data onto the raster scan pattern at any desired magnification, using either the same or different magnifications in the fast scan and the process directions. The data may be preprocessed (by means not shown) for the printing of halftoned images and/or text and other types of line art, so the data source 36 generically represents any suitable source of raster data for intensity modulating the laser beam 12. The drive current for the laser diode 16 is serially modulated by modulator 38 in accordance with the data values that are clocked out of the data source 36, thereby intensity modulating the laser beam 12 at the data clock rate in accordance with those data values.

Figure 2:
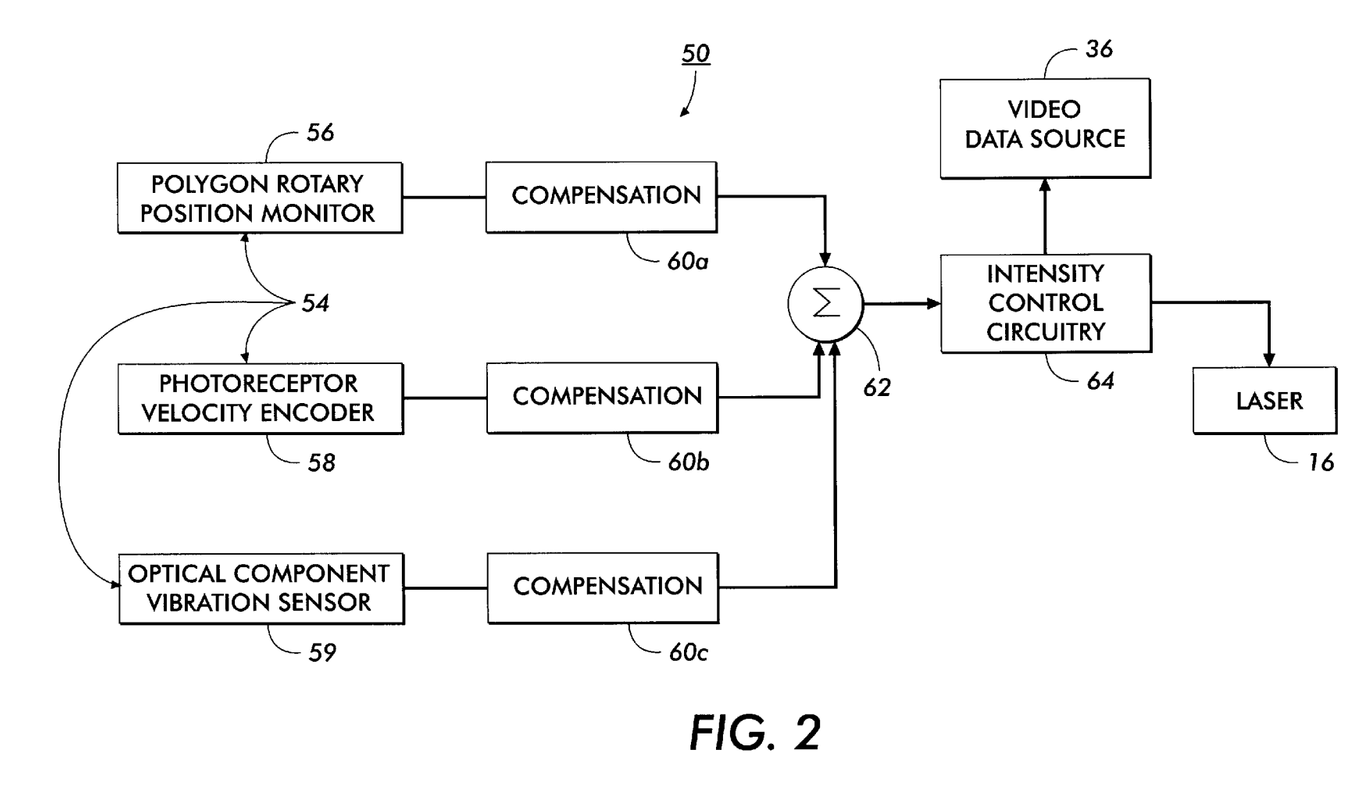
FIG. 2 is a schematic block diagram of an automated control circuit in accordance with the present invention.

FIG. 2 depicts a schematic block diagram of an exemplary automated control circuit in accordance with the present invention. Control system 50 is generally comprised of position deviation detection means 54 that provide signals indicating the position deviation caused by various components within the raster scanning system to a compensation blocks 60a, 60b and 60c. Compensation blocks 60, as will be described, determine the amount of position error resulting from the error or deviation detected by position deviation detection means 54. For a particular raster the resulting position error is represented by a compensation signal produced in one of the compensation blocks 60, subsequently summed to produce an overall compensation signal at the summation block 62, and then passed to the intensity control circuitry 64 to compensate for the position error. In turn, the intensity control circuitry operates in conjunction with the video data source 36 to produce signals that control the operation of laser 16 to adjust the level or intensity of exposure on the photoreceptor 14 of FIG. 1. Although FIG. 2 illustrates a plurality of compensation blocks, one for each detection means, it is to be understood that an alternative embodiment may exchange the order of the operations depicted. In particular, the sum all of the deviation signals output by such deviation means may be produced first and then a single compensation block would operate on the sum or total of the position deviation signals.

Turning to the position deviation detection means 54, FIG. 2 illustrates three possible detection means; polygon rotary position monitor 56, photoreceptor velocity encoder 58 and optical component vibration sensor 59. It is also noted that additional monitors and sensors may be employed to identify other sources of vibration in the printing system that contribute to raster position errors. Position monitor 56 is specifically designed to continuously produce a signal indicative of the facet from which the laser beam is being reflected. Such a signal, as is well-known in the ROS technology, can be utilized to identify a "signature" for the facet. For example, the pyramidal error signature may be classified for each polygon as a function of the polygon rotation angle. This information, encoded on the assembly of the polygon device after assembly and characterization, could then be stored in memory in the printing system at final assembly.

During use of the printing system the signature identified by the signal from position monitor 56 can then be employed to compensate for position error as a result of the polygon facet (e.g., polygon wobble). More specifically, the signal from position monitor 56 would be received by compensation block 60 where it would be interpreted to identify the current, or next facet. Then, using the facet information, compensation block 60 may access a memory where polygon characterization information is stored to retrieve a value representative of the positional error deviation for that particular facet; the positional error having been previously characterized and stored in the memory. In this way, polygon facet wobble error data may be obtained by compensation block 60.

Figure 3:
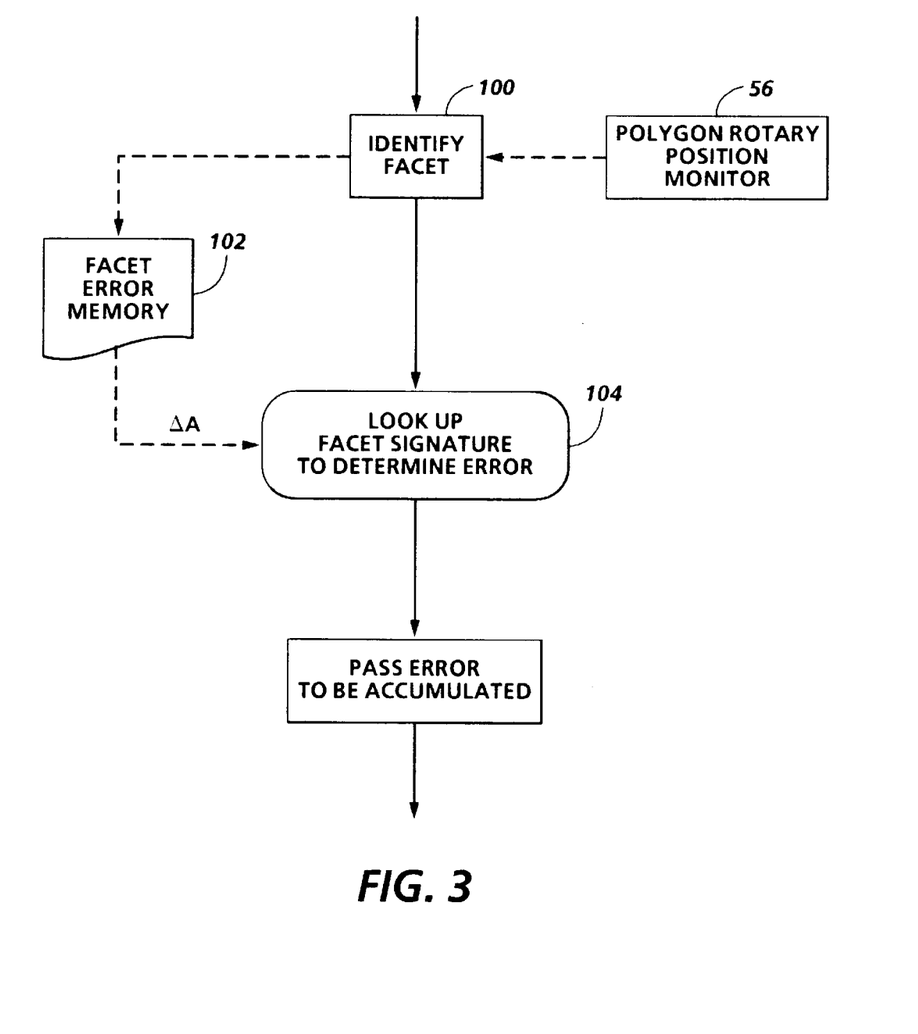
FIG. 3 is a data flow diagram depicting the principal steps used to determine the positional error caused by polygon wobble.
Figure 4:
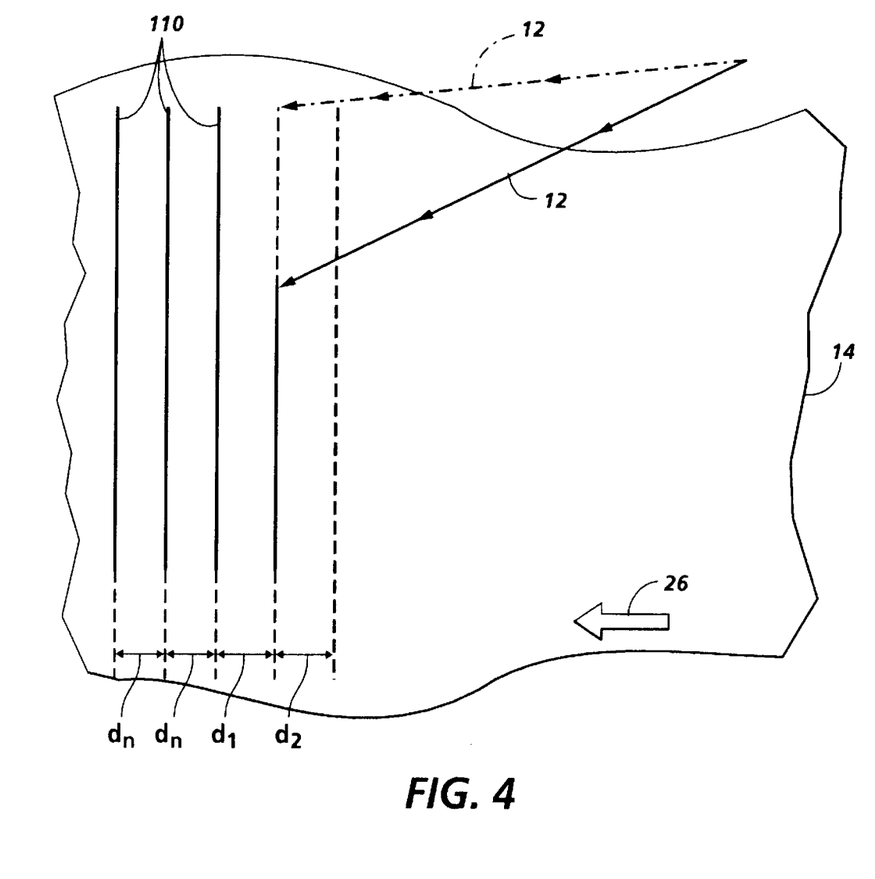
FIG. 4 is a highly magnified illustration of the exposure of individual rasters on the surface of a photoresponsive member.
Figure 5:
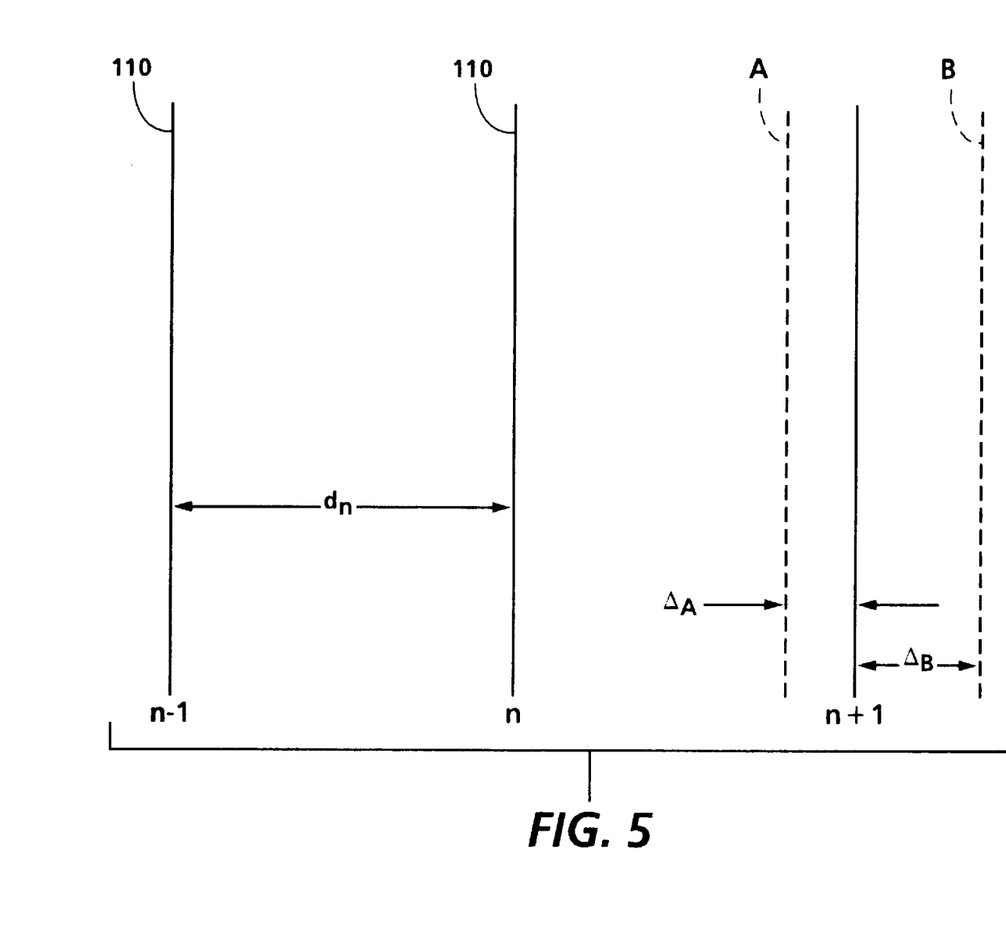
FIG. 5 is an illustration of the scanlines of FIG. 4 depicting the position error that the present invention is intended to correct.

By way of example, the data flow diagram of FIG. 3 and the raster scanline diagrams of FIGS. 4 and 5 represent the principal steps of determining the amount of position error to be compensated for polygon wobble. Turning first to FIG. 4, there is shown a highly magnified illustration of the exposure of individual rasters or scanlines 110 on the surface of photoresponsive member 14. During typical operation, member 14 moves in the process direction indicated by arrow 26, where successive rasters are exposed under the control of a laser emitting a beam 12. As shown, the rasters are scanned in a direction from bottom to top and are preferably spaced apart by a nominal distance $d_n$. Turning to FIG. 5, the positional error for a raster n+1 is represented by the reference character $\Delta$, where $\Delta_A$ is the positional error caused by polygon wobble and $\Delta_B$ is the positional error caused by nonuniform photoreceptor velocity. The error $\Delta_A$ is the distance that exposed raster A would deviate from the nominal position of line n+1 if the only source of position error was polygon wobble. Similarly, the deviation of raster B from nominal is reflected by position error $\Delta_B$, which is soley due to velocity nonuniformity. As illustrated, the independent positional errors for a given raster would have both a magnitude and a direction (before or after the nominal raster position).

Referring now to FIG. 3, the principal steps used to determine the positional error caused by polygon wobble will be described. As will be understood, these steps may be accomplished using circuitry and control logic as represented by blocks 56, 60a and 62 of FIG. 2. First, using a signal output from position monitor 56, step 100 identifies the next facet from which the laser beam will be reflected. Once identified, the facet information is utilized to access memory 102 and retrieve or "look up" the positional error associated with polygon wobble for the facet, step 104. After retrieving the positional error value from memory, the error value is passed on to a subsequent process, step 106, preferably to be accumulated with other positional error values before compensating for the total position error.

A second source of position error, nonuniform photoreceptor velocity, is represented in FIG. 5 by reference character $\Delta_B$. In a preferred embodiment, the photoresponsive member, or an encoder attached to the drive mechanisms thereof, would be encoded so that a sensor would produce a signal proportional to the instantaneous velocity of the surface of the photoresponsive member. In such an embodiment, the fractional spacing error ($\Delta_B/d_n$) is equal to the fractional velocity error. More importantly, because of the inherent inertia of the photoresponsive member and its associated drive mechanisms (e.g., motor 40), the instantaneous velocity is believed to be relatively constant over a small number of scanlines. Thus, the instantaneous velocity measured during the exposure of a particular raster n may be employed to "predict" the instantaneous velocity, and positional error, at a subsequent raster n+1.

Figure 6:
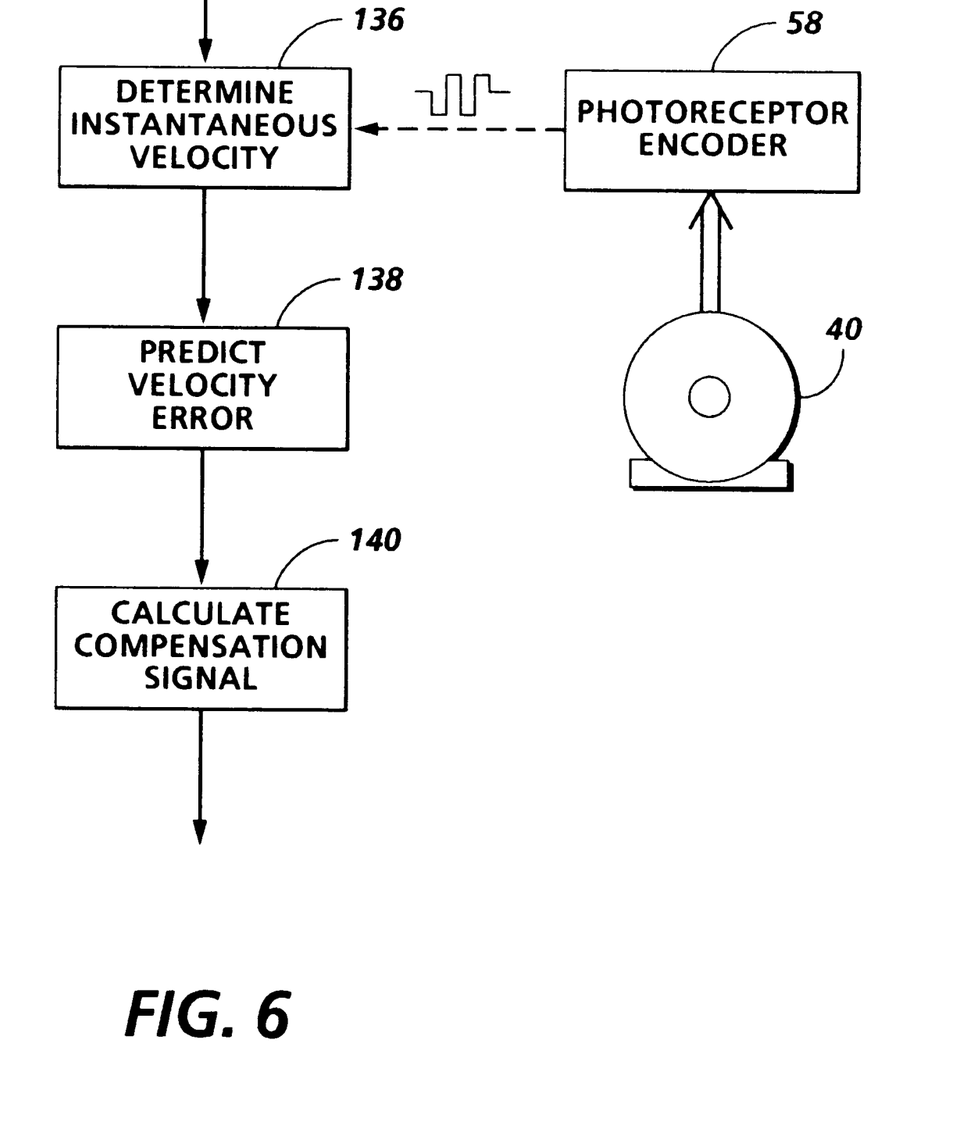
FIG. 6 is a data flow diagram illustrating the determination of raster position error due to velocity nonuniformity.

The data flow diagram of FIG. 6 illustrates the determination of the laser intensity correction or compensation signal due to photoreceptor velocity nonuniformity. In FIG. 6, step 136 first receives the input from encoder 58 to determine the current photoreceptor velocity (as it is being driven by motor 40). Step 136 operates to determine the instantaneous velocity of the photoresponsive member using methods well-known in the art of photoreceptor motion control. The instantaneous velocity is subsequently made available to step 138, where it is employed to calculate or "predict" the velocity error by comparing the instantaneous velocity to a nominal velocity. This predicted error is used at step 140 to calculate the compensation signal. Subsequently, the compensation signal will be used to make a laser intensity adjustment that eliminates the effect of the velocity error. In a preferred embodiment this laser intensity correction signal for photoreceptor velocity errors would be added to or summed with correction signals from other error sources.

In compensation blocks 60a and 60b of FIG. 2, the operations represented in FIGS. 3 and 6, respectively, are preferably accomplished by a processor, microcontroller or similar compensation means suitable for receiving input signals from the error detection means 54 and interpreting such signals to determine the proper corrections or compensation of the laser intensity therefrom. As noted previously, such errors may arise from polygon wobble, nonuniform motion in the photoresponsive member, or from other sources of vibration and motion within the printing system, including vibration of the optical system components (e.g., pre-scan and post-scan optics). Once such errors are determined and converted into compensation signals for the laser intensity control circuit, they are then summed for a particular raster and the compensation may be accomplished.

In a preferred embodiment, the position error compensation is accomplished using a linear correction method; where the fractional change in laser power or pulse width, refered to as intensity herein, is equal to the fractional error in the raster position spacing ($\Delta/d$). Thus, if the combined positional error from all sources is +0.5% (−0.5%) for the next scanline, the laser power or intensity would be increased (decreased) by 0.5% from its nominal intensity for that raster to compensate for the error. In an alternative embodiment, a nonlinear correction may be employed that is more compatible with the system tone reproduction function than is a simple linear function. Because the intensity changes will tend to be small, linear correction would be sufficient for most cases. The important consideration is that the modulation of the intensity be accomplished at a frequency equal to or greater than the frequency at which the motion errors to be corrected occur.

Referring again to FIG. 2, control of the intensity of the laser beam is accomplished by intensity control circuitry 64, in response to the compensation signals generated by blocks 60 and summed by summation circuit 62, where the control may be preferably accomplished in one of two methods. The first method for controlling the beam or spot intensity in a localized region is by actually adjusting the variation of the intensity of the beam. This may be accomplished by varying the power applied to the laser 16 using any of a number of well-known methods, such as varying the current to a diode laser. Alternatively, the local exposure intensity may be controlled by altering the pulse width of the beam for each pixel position along the raster. In other words, by increasing/decreasing the exposure period for each pixel position in a laser scanning system responsive to pulse-width signals such as the Xerox 4850 Highlight Color Laser Printing System. As a result of the exposure intensity adjustment, the motion error is compensated for by a variation in the spot size or density of the developed image. This compensation will tend to preserve average exposure, and thus, upon development, preserve average density and thereby decrease reflectance modulation that produces noticeable banding in printed halftones. As previously noted, it may be possible to replace the exposure device (laser) with alternative image exposure means, possibly including full-width LED arrays and ionographic arrays, so long as the exposure means allows for modulation of the size or density of the developed pixel.

In recapitulation, the present invention is a method and apparatus for compensating for motion error inherent in a raster output scanning printing system by adjusting the intensity of image exposure to effect a correction in the output image. The invention is particularly well suited to compensate for motion errors arising from a plurality of sources by first determining a compensation signal for each source of error then summing the compensation signals and making one compensating adjustment to the intensity of individual scan rasters based upon the total motion error attributed thereto.

It is, therefore, apparent that there has been provided, in accordance with the present invention, a method and apparatus for compensating for raster position errors in output scanners. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A raster output scanning printer, including:

an exposure device suitable for emitting a light beam therefrom;

a movable imaging member;

a rotating, multifaceted polygon suitable for reflecting the light beam toward a photoresponsive surface of said imaging member;

a controller for controlling the velocity of the photoresponsive surface about a nominal velocity;

means for monitoring the velocity of the photoresponsive surface and determining the deviation thereof from the nominal velocity;

means for determining the deviation of the position of the light beam from a nominal position on the photoresponsive surface;

first compensation means, responsive to the velocity deviation of the photoresponsive surface, for producing a first motion compensation signal;

second compensation means, responsive to the light beam position deviation, for producing a second motion compensation signal;

a summing circuit for summing the first motion compensation signal and the second motion compensation signal to produce a cumulative error signal; and means for altering the exposure level produced by the light beam in response to the cumulative error signal to expose the imaging member in a manner so as to compensate for the motion error arising from the velocity and light beam deviations.

2. The raster output scanning printer of claim 1, wherein said means for monitoring the velocity of the photoresponsive surface comprises:

an encoder for producing a signal in response to incremental movement of said movable imaging member; and a processor for determining the instantaneous velocity of the movable imaging member and comparing the instantaneous velocity to a nominal velocity to determine the deviation from the nominal velocity.

3. The raster output scanning printer of claim 1, wherein said means for determining the deviation of the position of the light beam comprises:

a polygon position monitor for generating a signal indicative of the reflecting polygon facet;

a plurality of memory locations within a memory device to store facet signature data indicative of the deviation of the reflected beam from a nominal position; and a processor, responsive to the signal generated by said polygon position monitor, for retrieving facet data indicative of the deviation of the beam reflected from the polygon facet.

4. The raster output scanning printer of claim 1, further including means for monitoring the vibration of optical components therein and generating a third compensation signal as a result of the vibration, where said summing circuit adds the third compensation signal to produce the cumulative error signal.

5. The raster output scanning printer of claim 1, wherein said means for altering the exposure level includes means for linearly adjusting the exposure level in proportion to the level of the cumulative error signal.

6. The raster output scanning printer of claim 5, wherein said means for altering the exposure further includes means for adjusting the intensity of the light beam.

7. The raster output scanning printer of claim 5, wherein said means for altering the exposure further includes means for adjusting the exposure period for individual pixels within a raster.

\* \* \* \* \*